United States Patent
Kim et al.

(10) Patent No.: US 6,657,790 B2
(45) Date of Patent: Dec. 2, 2003

(54) OBJECTIVE LENS HAVING SHORT WAVE FILTER INSERTED THEREIN AND OPTICAL PICKUP DEVICE EMPLOYING THE OBJECTIVE LENS

(75) Inventors: Young Sik Kim, Yongin-si (KR); Yong Kap Shin, Seoul (KR)

(73) Assignee: LG Electronics, Inc., Seoul (KR)

( * ) Notice: Subject to any disclaimer, the term of this patent is extended or adjusted under 35 U.S.C. 154(b) by 23 days.

(21) Appl. No.: 10/015,600

(22) Filed: Dec. 17, 2001

(65) Prior Publication Data

US 2002/0089915 A1 Jul. 11, 2002

(30) Foreign Application Priority Data

Dec. 29, 2000 (KR) ......................................... 2000/84998

(51) Int. Cl.[7] .......................... G02B 27/14; G02B 7/02; G02B 27/30; G02B 3/00; G11B 7/00
(52) U.S. Cl. ...................... 359/634; 359/823; 359/641; 359/642; 369/44.14
(58) Field of Search ................................. 359/642, 819, 359/355, 356, 558, 563, 564, 570, 722, 350, 823, 824, 634; 348/291, 342, 264; 369/44.14, 44.15

(56) References Cited

U.S. PATENT DOCUMENTS 5,589,882 A * 12/1996 Shiraishi et al. ............. 348/340
5,995,279 A * 11/1999 Ogino et al. .................. 359/355

\* cited by examiner

*Primary Examiner*—Ricky Mack
(74) *Attorney, Agent, or Firm*—Birch, Stewart, Kolasch & Birch, LLP

(57) ABSTRACT

An objective lens of an optical pickup device for both CD and DVD, in which a short-wave pass (SWP) filter is inserted in the objective lens, is capable of allowing the optical pickup device to have a light-weight, slim, simple, and miniaturized structure. The objective lens is divided into two lens portions with respect to a direction transverse to a beam transmitting path and provided with a short-wave pass (SWP) filter. The lens portions have planarized divisional surfaces facing each other, respectively. The objective lens reduces the space occupied by the SWP filter. Accordingly, the objective lens of the present invention alleviates a restriction in the design of an optical system caused thereby and an increased margin is secured.

13 Claims, 3 Drawing Sheets

OBJECTIVE LENS HAVING SHORT WAVE FILTER INSERTED THEREIN AND OPTICAL PICKUP DEVICE EMPLOYING THE OBJECTIVE LENS

BACKGROUND OF THE INVENTION

1. Field of the Invention

The present invention relates to an optical pickup device, and more particularly to an objective lens having selective transmittance.

2. Description of the Related Art

By virtue of steady efforts to increase the recording capacity of optical discs, a digital video disc (DVD) has been developed which has a recording capacity greater than those of compact discs (CDs). DVD not only has a high recording density (that is, a high track density), but also has a short distance between its disc surface and its information recording surface. Due to such features of DVD, optical pickup devices for DVDs have a difficulty in recording/ reproducing information. This is because there may be a spherical aberration caused by a variation in the distance between the disc surface and the information recording surface, a coma aberration caused by a tilting of the optical disc, and an astigmatism caused by defocus.

Spherical aberration serves to cause the intensity of the main lobe of light associated with an information recording medium region to be higher than the intensity of the side lobe of light associated with a region other than the information recording medium region. For this reason, such spherical aberration causes an interference between tracks. Coma aberration and astigmatism serve to make the optical system unstable, thereby degrading optical characteristics. Such spherical aberration, coma aberration, and astigmatism are caused by variations in the distance between the optical disc surface and the information recording surface, the index of refraction, the numeric aperture (NA) of the objective lens, the defocus amount, and the tilt angle of the optical disc.

However, where an optical pickup device uses objective lenses having different numeric apertures to adjust the diameter of a light beam emitted from a light source, it can have access to both CD and DVD.

Although access to both CD and DVD is possible using two objective lenses having different numeric apertures, an improved means has been proposed. For example, an optical pickup device has been proposed which includes an objective lens coated with an SWPi filter to have access to both CD and DVD.

FIG. 1 illustrates the configuration of an optical pickup device for both CD and DVD.

Referring to FIG. 1, the optical pickup device includes a first holographic pickup module (HPM) 101 for outputting a laser beam for DVD, a second HPM 102 for outputting a laser beam for CD, and a beam splitter 103 for transmitting the laser beam outputted from the first HPM 101 therethrough while reflecting the laser beam outputted from the second HPM 102. The optical pickup device also includes a collimator lens 104 for converting the laser beam emerging from the beam splitter 103 into a collimated beam, a mirror 105 for reflecting the collimated beam passing through the collimator lens 104, thereby changing the optical path of the collimated beam, an objective lens 106a for focusing the beam reflected by the mirror 105 onto a desired spot on a disc 107, and an SWP filter 106b for adjusting the numeric aperture of the objective lens 106a.

The light beam outputted from the first HPM 101 is transmitted through the beam splitter 103, and then converted into a collimated beam by the collimator lens 104. On the other hand, the light beam outputted from the second HPM 102 is reflected by the beam splitter 103, and then converted into a collimated beam by the collimator lens 104. The optical path of the collimator beam from the collimator lens 104 is changed from horizontal to vertical by the mirror 105. In this case, the mirror 105 is a half mirror. The light beam reflected by the mirror 105 is focused onto a desired spot on the disc 107 via the objective lens 106a. The light beam incident to the 106a via the mirror 105 passes through the SWP filter 106b which, in turn, selectively filters components of the light beam corresponding to wavelengths of 650 nm and 780 nm, so as to allow access to both CD and DVD, respectively.

The conventional optical pickup device for both CD and DVD uses an SWP filter coated on the objective lens.

In this case, however, it is difficult to uniformly coat the SWP filter on the surface of the lens having a convex or concave shape. In particular, there is a difficulty in performing a coating process for edge portions of the lens. Furthermore, it is difficult to form a mask to be used in the coating process for the convex or concave lens surface. For this reason, it is difficult to obtain superior optical characteristics.

Thus, there is a difficulty in achieving a desired phase correction, and a degradation in optical characteristics caused by non-uniform coating of the filter.

SUMMARY OF THE INVENTION

Therefore, the present invention has been made in view of the above mentioned problems, and an object of the invention is to provide an objective lens of an optical system for an optical pickup device which is divided into two lens portions and provided with an SWP filter inserted between those lens portions while being integral with the lens portions.

Another object of the invention is to provide an optical pickup device to which the SWP filter-inserted objective lens is applied.

In accordance with one embodiment, the present invention provides an optical pickup device for both CD and DVD comprising: a first holographic pickup module (HPM) for outputting a laser beam for DVD; a second HPM for outputting a laser beam for CD; a beam splitter for transmitting the laser beam outputted from the first HPM therethrough while reflecting the laser beam outputted from the second HPM; a collimator lens for converting the laser beam emerging from the beam splitter into a collimated beam; a mirror for reflecting the collimated beam passing through the collimator lens, thereby changing an optical path of the collimated beam; and an objective lens for focusing the beam reflected by the mirror onto a specific spot on a disc, the objective lens having a short-wave pass (SWP) filter inserted in the objective lens and adapted to adjust a numeric aperture of the objective lens.

The objective lens may be divided into two lens portions in a transverse direction to a beam transmitting path, and the SWP filter may be interposed between facing divisional surfaces of the lens portions. The divisional surface of each of the lens portions must be planarized.

The SWP filter may be coated on a selected one of the divisional surfaces or interposed between the divisional surfaces.

In accordance with another embodiment, the present invention provides an objective lens divided into two lens portions in a transverse direction to a beam transmitting path and provided with an SWP filter, the lens portions having planarized divisional surfaces facing each other, respectively.

In this embodiment, the SWP filter may be coated on a selected one of the divisional surfaces or interposed between the divisional surfaces.

In accordance with another embodiment, the present invention provides a method for fabricating an objective lens comprising the steps of: dividing an objective lens into two lens portions in a transverse direction to a path for transmitting a light beam; planarizing respective divisional surfaces of the lens portions; coating an SWP filter on a selected one of the divisional surfaces; and pressing the lens portions against each other using an ultraviolet bonding process so that the lens portions are bonded together.

In accordance with another embodiment, the present invention provides a method for fabricating an objective lens comprising the steps of: dividing an objective lens into two lens portions in a transverse direction to a path for transmitting a light beam; interposing a short-wave pass filter between divisional surfaces of the lens portions; and pressing the lens portions against each other using an ultraviolet bonding process so that the lens portions are bonded together.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of the present invention will be described in detail with reference to the annexed drawings.

Figure 1:
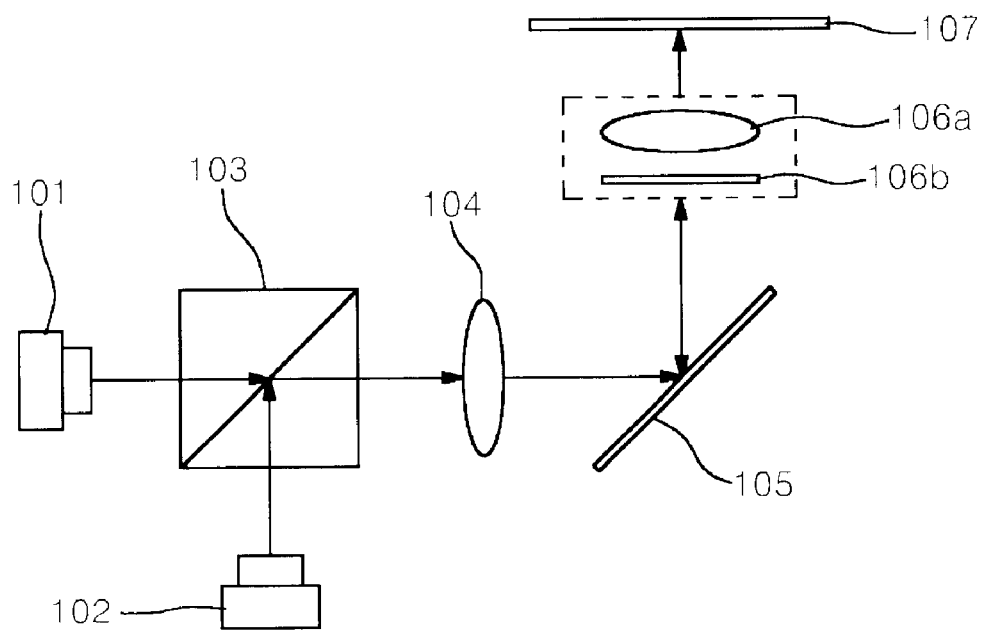
FIG. 1 is a schematic view illustrating the configuration of a general optical pickup device for both CD and DVD.
Figure 2:
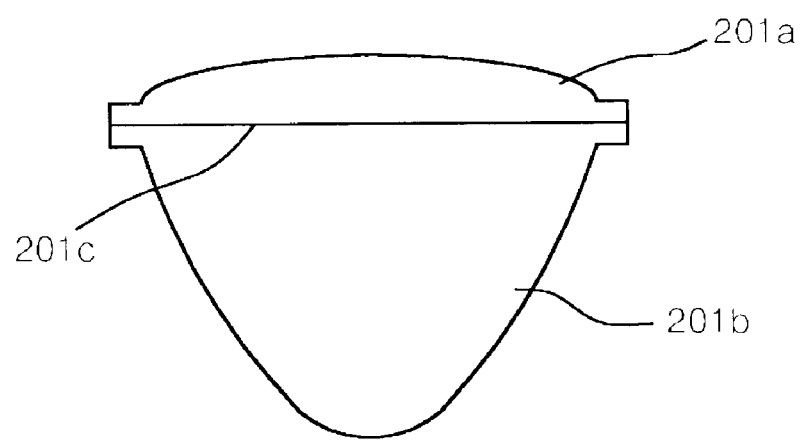
FIG. 2 is a sectional view illustrating the structure of an SWP filter-inserted objective lens according to the present invention.

FIG. 2 is a sectional view illustrating the structure of an SWP filter-inserted objective lens according to the present invention. As shown in FIG. 2, the SWP filter-inserted objective lens of the present invention is divided into two lens portions, that is, a first lens portion 201a and a second lens portion 201b, and provided with an SWP filter 201c interposed between facing planarized surfaces of the first and second lens portions 201a and 201b.

Figure 3A:
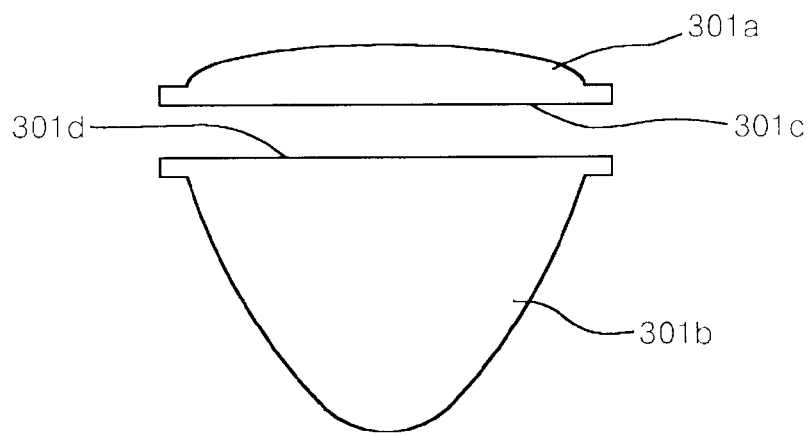
FIGS. 3a to 3c are views illustrating a method for fabricating the objective lens according to the present invention.
Figure 3B:
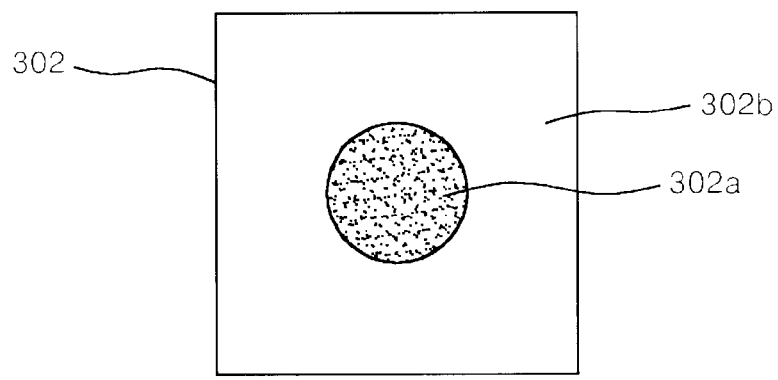
Figure 3C:
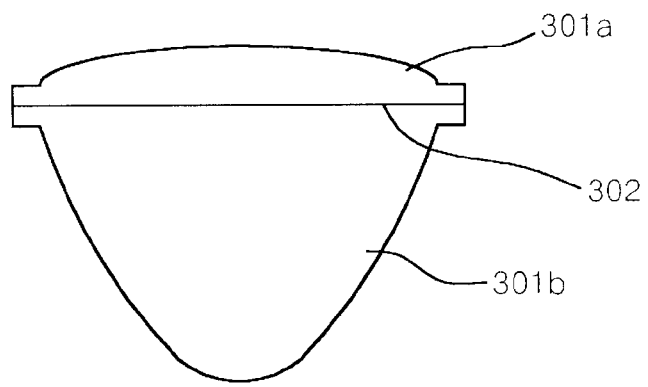

FIGS. 3a to 3c are views illustrating a method for fabricating the SWP filter-inserted objective lens according to the present invention, respectively.

FIG. 3a shows the structure of the objective lens divided into the first and second lens portions 301a and 301b. The divided lens portions 301a and 301b have divisional surfaces 301c and 301d facing each other while being planarized, respectively.

FIG. 3b shows an SWP filter 302 interposed between two divided lens portions of the objective lens. This SWP filter 302 has a first filtering region 301a having optical filtering characteristics capable of allowing components of a light beam respectively corresponding to wavelengths of 650 nm and 780 nm, and a second filtering region 301b having optical filtering characteristics capable of transmitting the light beam component corresponding to the wavelength of 650 nm while reflecting the light beam component corresponding to the wavelength of 780 nm.

FIG. 3c shows a complete structure of the objective lens in which the SWP filter is inserted between the divided lens portions of the objective lens.

In the structure of FIG. 3c, the SWP filter 302 is interposed between the first and second lens portions 301a and 301b.

Figure 4:
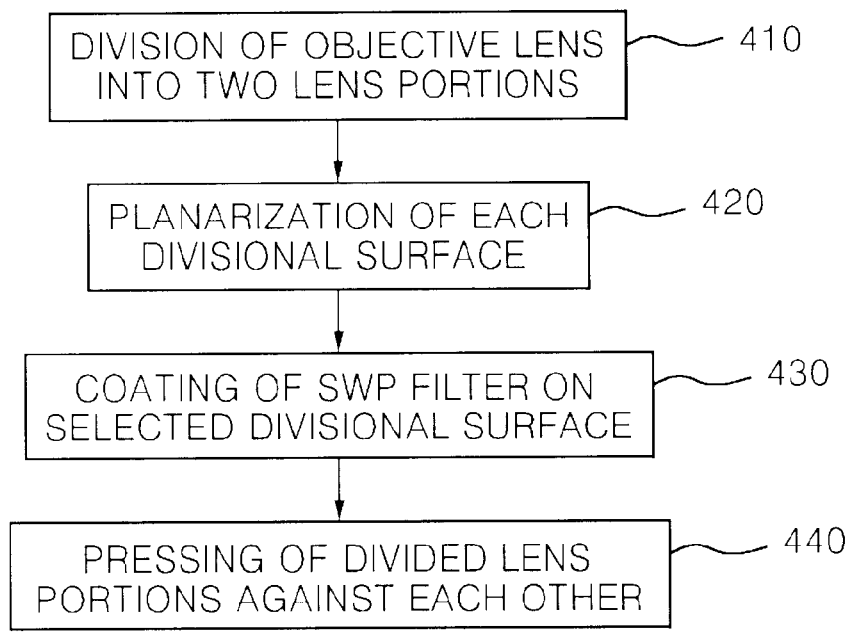
FIG. 4 is a flow chart illustrating the objective lens fabricating method according to the present invention.

FIG. 4 is a flow chart illustrating a method for fabricating the objective lens according to the present invention.

In accordance with the illustrated method, the objective lens is first divided into two lens portions in a transverse direction to a path for transmitting a light beam (Step 410). Generally, the objective lens has a thin spherical lens surface at one surface thereof and a thick spherical lens surface at the other surface thereof. Accordingly, the objective lens, which has a certain thickness, is divided into two lens portions in a transverse direction to the beam transmitting path so that the lens portions have the thin and thick spherical lens surfaces, respectively.

The divisional surface of each lens portion formed in accordance with the division of the objective lens is planarized using an abrasive (Step 420). Practically, the divisional surface of each lens portion formed after the division of the objective lens is not planar. Such a non-planar surface may cause a refraction of the light beam incident thereto. Accordingly, the divisional surface of each lens portion is polished using an abrasive so that it is planarized as much as possible.

Thereafter, an SWP filter, which is previously prepared, is coated on one of the divisional surfaces (Step 430). Preferably, the coating of the SWP filter is carried out using an ultraviolet (UV) coating process.

The lens portions are then arranged such that the coated divisional surface and non-coated divisional surface face each other. In this state, the lens portions are pressed against each other using an UV bonding process so that they are bonded together (Step 440).

Figure 5:
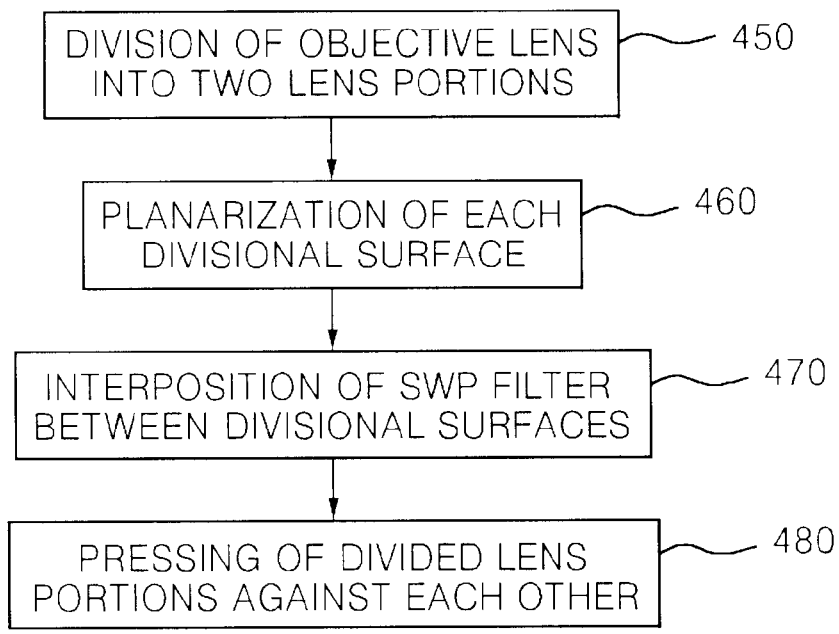
FIG. 5 is a flow chart illustrating another objective lens fabrication method according to the present invention.

FIG. 5 is a flow chart illustrating another objective lens fabrication method according to the present invention.

In accordance with this method, steps 450 and 460 are first carried out. These steps may be easily understood by referring to steps 410 and 420 of FIG. 4.

Thereafter, the SWP filter is interposed between the facing planarized divisional surfaces of the lens portions (Step 470).

In this case, it is preferred that the SWP filter have the same size as each divisional surface of the objective lens.

After the interposition of the SWP filter, the divisional surfaces are pressed against each other using an UV bonding process so that they are integrally bonded together (Step 480).

As apparent from the above description, the objective lens of the present invention used in an optical pickup device reduces the space occupied by the SWP filter, as compared to the optical system used in conventional optical pickup devices. Accordingly, the objective lens of the present invention alleviates a restriction in the design of an optical system caused thereby.

Also, the objective lens of the present invention can be implemented using a reduced number of elements, so that it can provide an improved workability. In addition, it is possible to reduce the weight of the optical pickup actuator to which the objective lens of the present invention is applied. Accordingly, there is an advantage in that an increased margin is secured.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pickup device comprising:
    light sources for outputting laser beams having different wavelengths;
    an optical means including a beam splitter for selectively transmitting said laser beams from light sources and a collimator lens for converting said laser beams from the beam splitter into collimated beams;
    an objective lens for focusing said laser beams from the collimator lens onto a disc and having a short wave pass filter therein to adjust a numeric aperture of the objective lens.

2. The optical pickup device according to claim 1, wherein the objective lens is divided into two lens portions in a transverse direction to a beam transmitting path, and the short wave pass filter is interposed between facing divisional surfaces of the lens portions.

3. The optical pickup device according to claim 2, wherein the divisional surface of each of the lens portions are planarized.

4. The optical pickup device according to claim 1, wherein the short wave pass filter is coated on a selected one of the divisional surfaces.

5. The optical pickup device according to claim 1, wherein the short wave pass filter is interposed between the divisional surfaces.

6. An objective lens comprising:
    two lens portions dividing said objective lens in a transverse direction to a beam transmission path, and
    a short wave pass filter having at least two portions which selectively transmit laser beams, wherein the lens portions have planarized divisional surfaces facing each other, respectively.

7. The objective lens according to claim 6, wherein the short wave pass filter is coated on a selected one of the planarized divisional surfaces.

8. The objective lens according to claim 6, wherein the short wave pass filter is interposed between the planarized divisional surfaces.

9. The objective lens according to claim 6, wherein the short wave pass filter includes a first portion transmitting both a laser beam having a shorter wavelength and a laser beam having a longer wavelength, located at a center portion of the short wave pass filter, and a second portion transmitting a laser beam having a shorter wavelength and reflecting a laser beam having a longer wavelength, located at a surrounding portion except the first portion.

10. A method for fabricating an objective lens comprising the steps of:
    dividing an objective lens into two lens portions in a transverse direction to a path for transmitting a light beam;
    planarizing respective divisional surfaces of the lens portions;
    coating a short wave pass filter on a selected one of the divisional surfaces; and
    pressing the lens portions against each other using an ultraviolet bonding technique so that the lens portions are bonded together.

11. The method according to claim 10, wherein the step of planarizing the divisional surfaces is carried out using an abrasive.

12. The method according to claim 10, wherein the short wave pass filter basically transmits a laser beam having shorter wavelength and reflects a laser beam having longer wavelength and comprises a region for allowing both laser beams to be transmitted therethrough.

13. A method for fabricating an objective lens comprising the steps of:
    dividing an objective lens into two lens portions in a transverse direction to a path for transmitting a light beam;
    interposing a short wave pass filter between divisional surfaces of the lens portions; and
    pressing the lens portions against each other using an ultraviolet bonding process so that the lens portions are bonded together.

* * * * *